(12) United States Patent
Friedlob

(10) Patent No.: US 6,298,595 B1
(45) Date of Patent: Oct. 9, 2001

(54) WASHER SHAPED CHUM FOR FISHING

(76) Inventor: Bert J. Friedlob, 20301 W. Country Club Dr., Aventura, FL (US) 33180

( * ) Notice: Subject to any disclaimer, the term of this patent is extended or adjusted under 35 U.S.C. 154(b) by 0 days.

(21) Appl. No.: 09/324,220

(22) Filed: Jun. 2, 1999

(51) Int. Cl.⁷ .................................................. A01K 85/00
(52) U.S. Cl. ................................................................. 43/42.06
(58) Field of Search .................... 43/44.99, 4.5, 43/42.06, 44.9, 42.37; 426/1

(56) References Cited

U.S. PATENT DOCUMENTS

| | | | |
|---|---|---|---|
| 2,827,376 | * | 3/1958 | Breuer ........................................ 426/1 |
| 3,163,958 | * | 1/1965 | Quinn ................................... 43/42.06 |
| 3,410,689 | * | 11/1968 | Nathan ................................. 43/42.06 |
| 3,605,316 | * | 9/1971 | Rogers ................................. 43/42.06 |
| 3,722,128 | * | 3/1973 | Tremblay ............................. 43/42.06 |
| 3,726,689 | * | 4/1973 | Patashnik . | |
| 4,710,385 | * | 12/1987 | Vickers ..................................... 426/1 |
| 4,890,411 | * | 1/1990 | Buccilli ............................... 43/42.06 |
| 5,827,551 | * | 10/1998 | Prochnow ................................ 426/1 |
| 6,009,657 | * | 1/2000 | Morton .................................... 43/42 |

OTHER PUBLICATIONS

Hardie, Jim; New Fish Chum has Base of Florida Citrus, Miami Herald, Thursday Nov. 3, 1994, Edition: KY, Section: KYS, p.: 1B.*

* cited by examiner

Primary Examiner—Charles T. Jordan
Assistant Examiner—Nicholas W DiCostanzo
(74) Attorney, Agent, or Firm—Robert M. Schwartz

(57) ABSTRACT

A washer shaped chum that can be secured to a fishing line that is particularly designed to release scent in a controlled release manner, the controlled release mechanism allows an extension of the time the fish would be attracted to the region surrounding the bait and the hook, said chum being composed essentially of fishmeal, fish oil, an inorganic salt, an organic hydrophobic substrate and a glident.

16 Claims, 1 Drawing Sheet

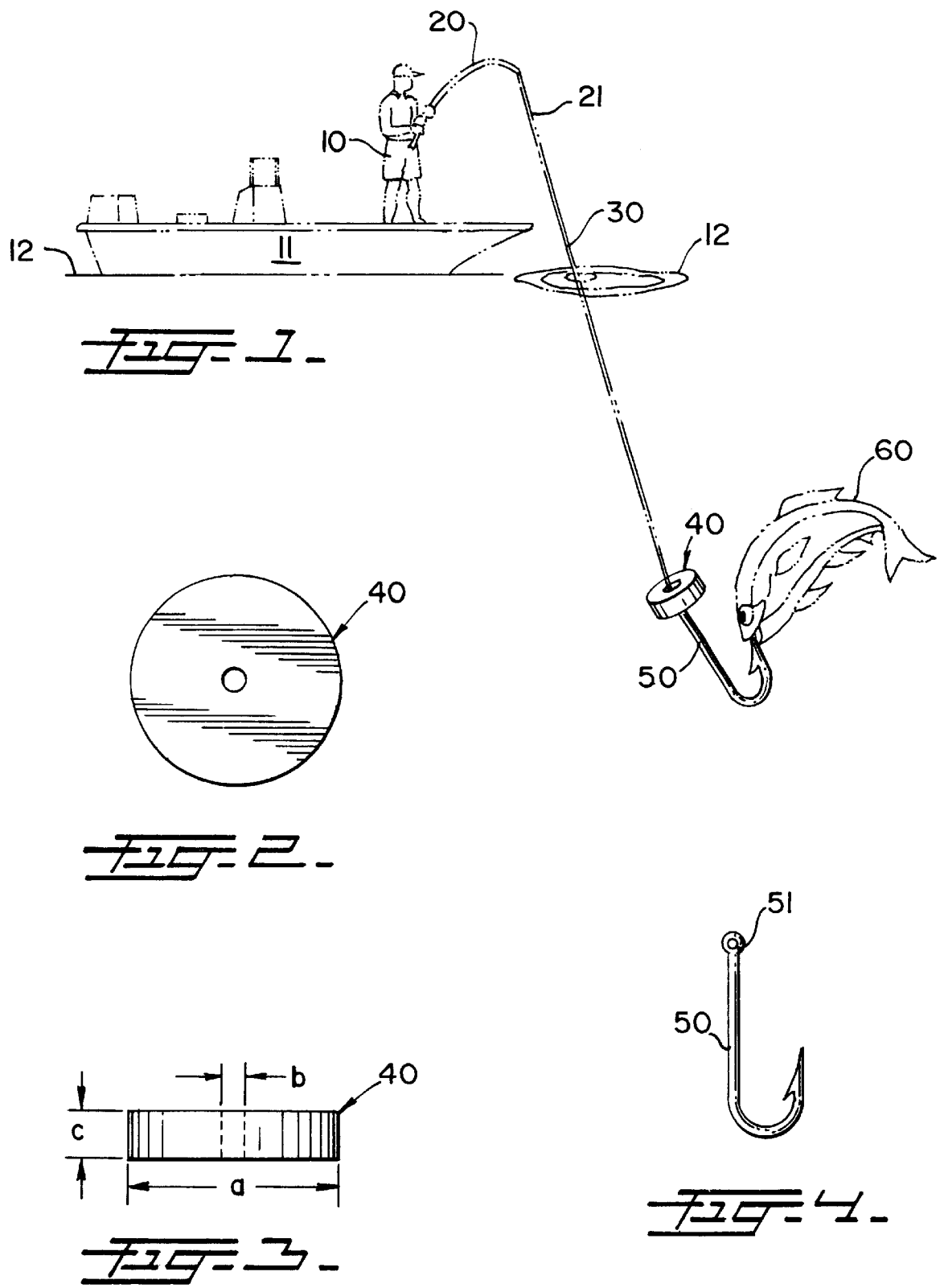

WASHER SHAPED CHUM FOR FISHING

FIELD OF THE INVENTION

This invention relates generally to a novel type of scent that brings the fish to the bait for use while fishing and its method of use. More particularly, the invention relates to a novel washer shaped chum that allows a controlled release of the scent over time.

BACKGROUND OF THE INVENTION

The sport of fishing has long enjoyed a special admiration amongst its enthusiasts. Yet, with all the knowledge and sophistication of artificial lures, electronic aids, etc. that exist in our world, the simple goal of fishing is to attract and entice the fish to such an extent that they grab the bait on the end of the fisher's hook. The bait, which is held under water, does not retain a scent for any appreciable length of time. This necessitates the need for a chum.

Chum is commonly known and used amongst those who enjoy fishing. It usually consists of fish meal and fish oil that creates a sufficient scent to attract the fish. Once the fish have approached the area of the chum, they notice the baited hook and try to eat the bait. The problem exists with the current system that the meal and oil are washed away in a short period of time, and the relatively unappealing bait remains on the end of the hook. It is the object of this invention to produce a chum system near the bait that will control the release of the scent over a prolonged period of time and thus allow the fisher a greater chance of catching a fish.

The modern sport of fishing has witnessed many advances in recent years. Yet the simple use of a chum still remains a mainstay of the sport. The mixing of fishmeal with fish oil is an attempt to create a scent that leads fish to the bait on the hook. The described invention adds efficiency to the procedure, and increases the chances of the fish being attracted to the bait.

SUMMARY OF THE INVENTION

A controlled-release washer shaped chum is herein described which allows a fisher to attach a chum directly to his fishing line in close proximity to the bait and allow said washer shaped chum to emit its scent over a protracted period of time. The washer shaped chum consists essentially of 1–70% fish meal, 0.1–2% fish oil, 25–95% of an inorganic salt, 0.5–20% of an organic hydrophobic substrate, 0.05–5% of a glident. It is compressed by conventional means into a shape suitable for its function. The chum is circular with an open conduit in its center. The diameter of the washer shaped chum is between 0.125 and 1.00 inches. The diameter of the conduit is between 0.0625 and 0.25 inches. The washer shaped chum has a thickness between 0.125 and 0.75 inches. The conduit allows the fishing line to be threaded through the washer shaped chum and allows the washer shaped chum to be in close proximity to the hook which is holding the bait. This creates a system with a controlled-release of the scent in close proximity to the bait, and thus increases the length of time that the fish will be attracted to the area containing the hook and the bait.

BRIEF DESCRIPTION OF THE DRAWINGS

FIG. 1 is a view of a person fishing with a conventional rod and reel. It shows the chum washer affixed to the fishing line in a position above the hook.

FIG. 2 is a top view of the washer shaped chum.

FIG. 3 is a side view of the washer shaped chum.

FIG. 4 is a hook.

DETAILED DESCRIPTION OF THE PREFERRED EMBODIMENT OF THE INVENTION

FIG. 1 one shows a fisher (10) on a boat (11), on the surface of water (12), with rod (20) tip (21), fishing line (30), washer shaped chum (40), hook (50) and a fish (60). Said hook (50) being secured to fishing line (30) through an eye (51). Said washer shaped chum (40) is a circular solid, with diameter (a), with an inner conduit having diameter (b), and a thickness (c). Said chum (40) being threaded on the fishing line (30) in close proximity to hook (50) when said line is tied with a fisherman's knot to eye (51). Optimum placement of hook (50) and chum (40) is beneath the user at the water surface (12) to a distance of 10 times the height of said user.

Said washer shaped chum (40) being composed of a fishmeal in amount from an amount of 1–70%, preferably 10–30%. This fishmeal can be selected from any ground up fishmeal, preferably, Menhaden. Said washer shaped chum (40) being further composed of fish oil in an amount from 0.1–2%. The washer shaped chum being further composed of an inorganic salt 25–95%. The inorganic salts can be Sodium, Magnesium, Potassium or Calcium Carbonate or Sulfate Salts. The chum is further composed of 0.5–20% of a hydrophobic organic substrate. Examples of such substances are: Cetyl or Stearyl Alcohol, Stearic Acid, Paraffin, Microcrystalline Wax, or other suitable wax. The chum further composed of a glident 0.5–5%, which allows the mixture to be compressed by conventional means. A preferred glident is amorphous fumed silica. The mixture is prepared and compressed by conventional means to the size shape and thickness desired. The resulting product is a controlled-release washer shaped chum that allows for the prolonged presence of fish scents in close proximity to the hook and bait of a fisher. Said washer shaped chum is subsequently secured to a fishing line as described above with a fisherman's knot, or other acceptable means known in the art, in close proximity to the hook and bait so as to release the fish scent in the water close to the bait.

What is claimed is:

1. A washer shaped chum composed in a manner such that it creates a system by which the scent of said chum is released by a controlled release mechanism over a period of time, said chum being composed essentially of fishmeal and excipients whose solubility in water ranges from insoluble to poorly soluble, said excipients being fish oil, inorganic salt, organic hydrophobic substrate and a glident, wherein said organic hydrophobic substrate is Cetyl or Stearyl Alcohol, Stearic Acid, Paraffin, Microcrystalline Wax, or other suitable wax.

2. A washer shaped chum according to claim 1, wherein said chum is a solid flat ring having a diameter greater than its thickness and having an inner conduit.

3. A washer shaped chum according to claim 2, wherein said conduit has a diameter between 0.0625 and 0.25 inches.

4. A washer shaped chum according to claim 2, wherein said chum has an overall diameter between 0.125 and 1.00 inches.

5. A washer shaped chum according to claim 2, wherein said chum has a thickness of between 0.125 and 0.75 inches.

6. A washer shaped chum according to claim 1, wherein said fish oil is Menhaden.

7. A washer shaped chum according to claim 6, wherein said fish oil is 0.1–25%.

8. A washer shaped chum according to claim 1, wherein said inorganic salt is a sodium, potassium calcium or magnesium carbonate or sulfate.

9. A washer shaped chum according to claim 1, wherein said organic substrate is stearic acid.

10. A washer shaped chum according to claim 1, wherein said organic substrate is 0.5–20%.

11. A washer shaped chum composed in a manner such that it creates a system by which the scent of said chum is released by a controlled release mechanism over a period of time, said chum being composed essentially of 1–70% menhaden and excipients whose solubility in water ranges from insoluble to poorly soluble, said excipients being fish oil, inorganic salt, organic hydrophobic substrate and a glident.

12. A washer shaped chum composed in a manner such that it creates a system by which the scent of said chum is released by a controlled release mechanism over a period of time, said chum being composed essentially of fishmeal and excipients whose solubility in water ranges from insoluble to poorly soluble, said excipients being fish oil, calcium sulfate, organic hydrophobic substrate and a glident.

13. A washer shaped chum composed in a manner such that it creates a system by which the scent of said chum is released by a controlled release mechanism over a period of time, said chum being composed essentially of fishmeal and excipients whose solubility in water ranges from insoluble to poorly soluble, said excipients being fish oil, 25–95%, inorganic salt, organic hydrophobic substrate and a glident, wherein said inorganic salt is a sodium, potassium calcium or magnesium carbonate or sulfate.

14. A washer shaped chum composed in a manner such that it creates a system by which the scent of said chum is released by a controlled release mechanism over a period of time, said chum being composed essentially of fishmeal and excipients whose solubility in water ranges from insoluble to poorly soluble, said excipients being fish oil, inorganic salt, organic hydrophobic substrate and a glident, wherein said chum is a solid flat ring having a diameter greater than its thickness and having an inner conduit, and wherein said glident is amorphous fumed silica.

15. A method for releasing chum scent comprising the steps of providing a chum composed essentially of fishmeal, fish oil, an inorganic salt, an organic hydrophobic substrate and a glident, and securing the chum to a fishing line by passing the line through a conduit in the chum, whereby scent is released in a controlled manner over a prolonged period of time in close proximity to a hook attached to the fishing line, and wherein said organic hydrophobic substrate is Cetyl or Stearyl Alcohol, Stearic Acid, Paraffin, Microcrystalline Wax, or other suitable wax.

16. A method as in claim 15, wherein said chum is a flat ring having a diameter greater than its thickness and having an inner conduit.

* * * * *